United States Patent [19]
Steuernagel et al.

[11] Patent Number: 4,664,066
[45] Date of Patent: May 12, 1987

[54] BIRDFEEDER APPARATUS

[76] Inventors: Robert J. Steuernagel, 12219 W. Verona Ct., West Allis, Wis. 53227; Leonard P. Flemming, 2536 N. 91st St., Milwaukee, Wis. 53226

[21] Appl. No.: 707,077

[22] Filed: Mar. 1, 1985

[51] Int. Cl.[4] ............................................. A01K 39/01
[52] U.S. Cl. .................................................. 119/52 R
[58] Field of Search ...................... 119/51 R, 52 R, 53

[56] References Cited

U.S. PATENT DOCUMENTS

| | | | |
|---|---|---|---|
| 1,069,943 | 8/1913 | Haffey | 119/52 R X |
| 1,361,045 | 12/1920 | Giesy | 119/53 X |
| 2,591,459 | 4/1952 | Meany | 119/52 R |
| 2,875,729 | 3/1959 | Gibson | 119/52 R |
| 2,884,899 | 5/1959 | Jackes et al. | 119/52 R X |

FOREIGN PATENT DOCUMENTS 1302211  7/1962  France ................................. 119/53

*Primary Examiner*—Robert P. Swiatek
*Attorney, Agent, or Firm*—Andrus, Sceales, Starke & Sawall

[57] ABSTRACT

A bird feeder is constructed from a conventional liter size plastic bottle having a bottom shell secured to the curved bottom wall. The shell is removed as by soaking. An adapter has a central ring which threads onto the bottle neck. A plurality of circumferentially distributed legs extend from the ring. The legs are spaced to correspond to the openings in the shell. The legs have ends which project through the openings and are connected to the shell, with the shell spaced from the end of the discharge neck. Inverting of the bottle results in gravity feed of bird seed into the shell. Removable perches are releasably secured to the edge of the ring. The adapter may be formed with seven legs, with three legs spaced for connection to a bottom shell having three openings, or four legs for a shelf having four openings.

11 Claims, 6 Drawing Figures

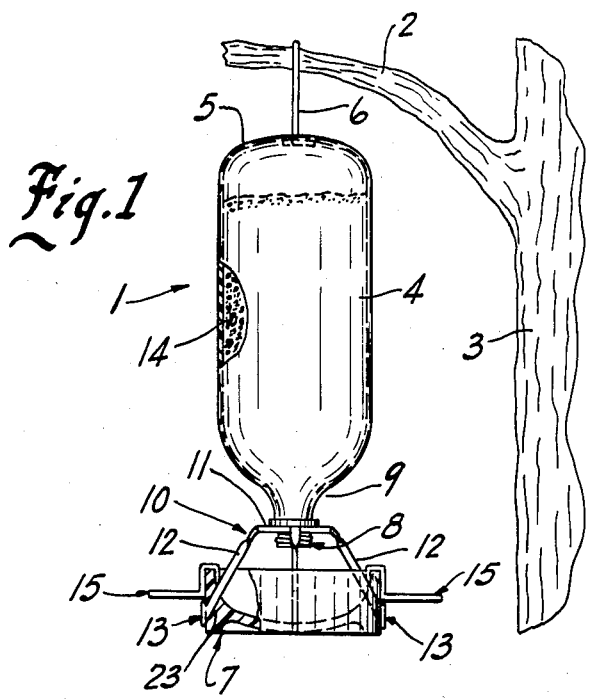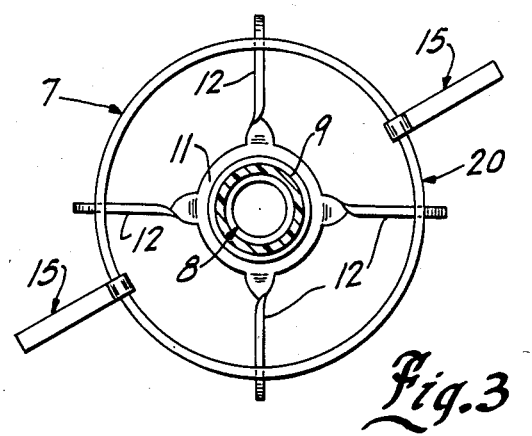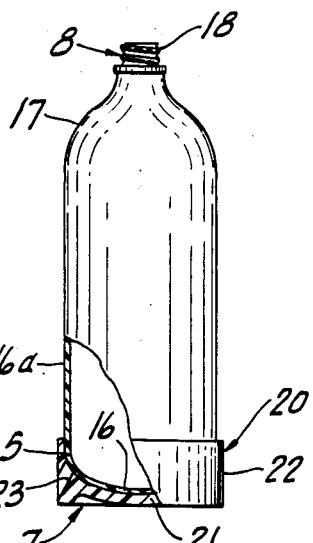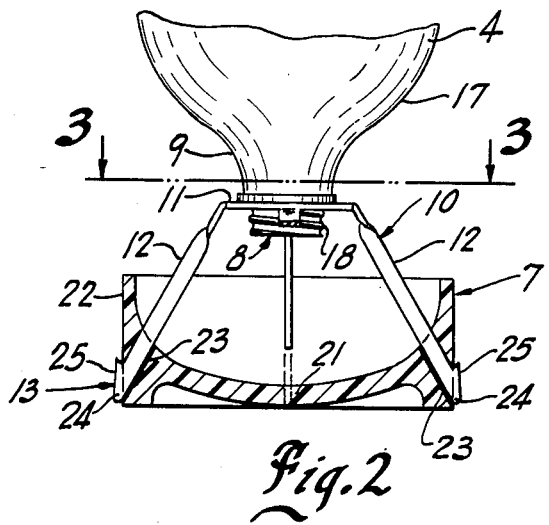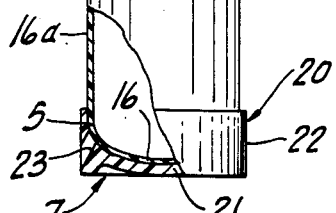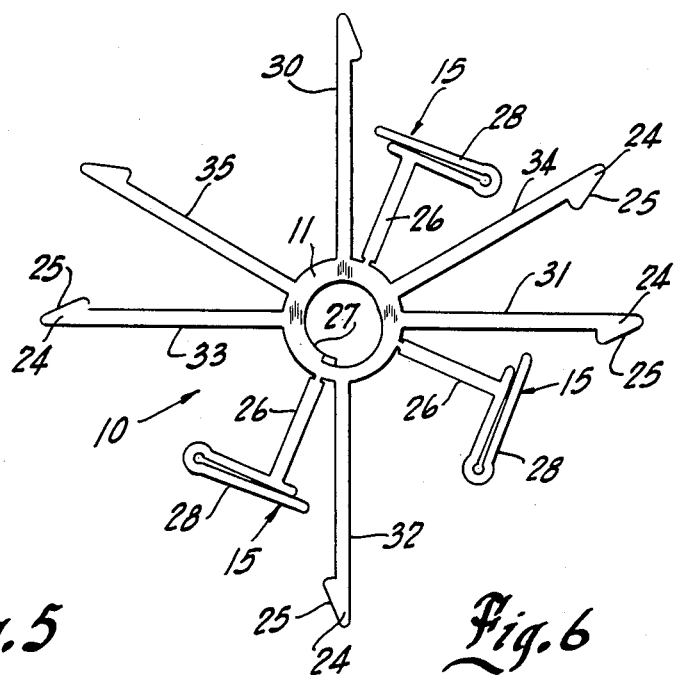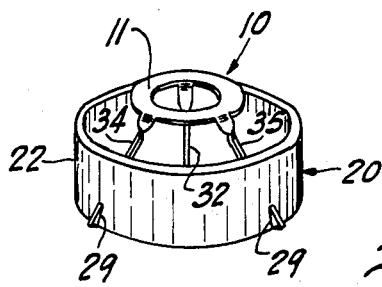

BIRDFEEDER APPARATUS

BACKGROUND OF THE PRESENT INVENTION

The present invention relates to a bird feeder and particularly to a bird feeder constructed from a plastic bottle unit.

Various forms and types of bird feeders are used in residential, institutional and like environments for feeding birds. The bird feeder generally may include a relatively small container adapted to be hung from a limb of a tree. The bottom end of the container opens into a feeding trough for automatically discharging the feed as it is eaten by the birds. Bird feeders may be relatively expensive for even the simpler unit. The feeder is generally subjected to the conventional weather environments and are necessarily periodically replaced. There is therefore a demand for a relatively inexpensive and readily available bird feeder.

SUMMARY OF THE PRESENT INVENTION

The present invention is particularly directed to a simple and inexpensive bird feeder and particularly one which can be constructed using the conventional plastic soda bottle. Thus, the present inventor unexpectedly realized that the conventional and widely used quart or liter soda bottle used for retailing of soft drinks and the like provides an excellent container for bird feeders and further that the integrated bottom wall structure of such bottles provides a highly suitable trough-like device.

More particularly in accordance with a preferred construction of the present invention, the bird feeder is constructed from the conventional liter size plastic bottle having the curved bottom wall merging with the cylindrical side wall through a suitable curved interconnection and an upper domed or curved top wall terminating in a centrally located discharge nozzle or neck. The bottom shell is removed such as by soaking of the bottle in water and carefully removing the shell from the bottle. The shell in commercial practice is formed with a plurality of equicircumferentially distributed openings. Certain bottles are formed with four openings and others are formed with three. In accordance with the teaching of the inventor, an adaptor bracket is provided consisting of a central member, adopted to be threaded onto or otherwise attached to the neck of the bottle. The adapter bracket further includes a plurality of circumferentially distributed legs corresponding to the distribution and spacing of the openings in the bottom shell. The legs are specially formed to be secured to the shell as by projecting through the openings to form connecting legs. In this manner, the bottom shell is interconnected and supported to the discharge end of the plastic bottle. The legs are constructed and arranged such that with the dimensions of the bottom shell and the discharge neck, the shell is held in slightly spaced relation at the end of the discharge neck. Inverting of the bottle results in the discharge opening providing for gravity feed of the food product from the bottle into the shell, which functions as a bird feeding trough.

In a particularly practical adaptation of the embodiment of the present invention, the adapter is formed with a common centered coupling ring. Projecting from the ring are three equalized circumferentially spaced legs for interconnection to the bottom shell having three openings. In addition, three additional legs are integrally secured to the ring and project outwardly therefrom and located with respect to one of the three common legs to form a four leg support for interconnection and adaptation to the bottle shell having four equalized circumferentially spaced openings. Thus a single adapter bracket is readily available for either of the conventional bottle units by removal of the unwanted legs. The adapter bracket is preferably of a relatively thin light plastic such that the excess legs can readily be removed with a sissors or other suitable cutting device.

The discharge end of the bottle is generally similar in shape to the bottom end. In the assembled relation, the rim of the shell is spaced from the bottle to define a feeding opening. Small ledge members may be provided on the adapter which can be removed and coupled to and project from the shell edge and form convenient ledges on which the birds stand while feeding.

The feeder is conveniently supported from the upper end. A hole is conveniently formed in the center of the bottle and a suitable hanger rod fed upwardly through the bottle with an inner enlargement abutting the interior of the bottle. The upper end of the rod is formed into a suitable hook or the like for hanging of the feeder in a tree or other suitable support.

With the use of the conventional throw-away bottle forming the principle components of the bird feeder, the feeder provides a particularly simple and inexpensive feeder while providing all of the necessary attributes and conveniences necessary for successful attraction of the birds to the feeder.

Although particularly described in the preferred embodiment using a conventional throw-away plastic soda bottle, the present invention can of course be readily formed of any other suitable container having a relatively small neck in combination with a suitably formed trough member having means for interconnection to the container neck by an adapter, within the broadest teaching of the present invention. Thus the container, the trough and the adapter can be specially and separately formed and constructed for sale as a bird feeder kit. This is particularly true in view of the readily availability of equipment for the mass production of the bottle type containers and and the shell.

The present invention thus provides a readily mass produced bird feeder which is attractive, effective and inexpensive.

BRIEF DESCRIPTION OF DRAWING

The drawings furnished herewith illustrate the best mode presently contemplated for carrying out the invention and are described hereinafter.

In the drawing:

FIG. 1 is a side elevational view of a bird feeder constructed with the teaching of the present invention and shown supported from the limb of a tree;

FIG. 2 is an enlarged vertical cross-section through the bird feeder shown in FIG. 1;

FIG. 3 is a horizontal section taken generally on line 3—3 of FIG. 2;

FIG. 4 is a side elevational view of a conventional soda bottle with parts broken away and sectioned to show details of construction;

FIG. 5 is a view of the connecting bracket with three legs shown in FIGS. 1—4; and FIG. 6 is a plan view of a bracket shown in FIGS. 1-5.

DESCRIPTION OF ILLUSTRATED EMBODIMENT

Referring to the drawing and particularly to FIGS. 1 and 2, a bird feeder 1 is shown suspended from the limb 2 of a tree 3. The bird feeder 1 includes a cylinderical container 4 having a closed top wall 5. A suspending hook member 6 is secured to the top wall and extends outwardly therefrom for supporting of the bird feeder from the tree limb 2. An annular feeding trough 7 is secured to the lower end of the container 4. The trough 7 is a cup-shaped member having an annular upstanding side wall. The lower end of the container 4 includes a tubular discharge neck 8 which extends downwardly from the bottom wall 9 of the container 4. A trough-mounting bracket 10 has an inner member 11 secured to the neck 8 and a plurality of supportive legs 12 which extend outwardly and downwardly into the trough 7. The outer ends of the legs 12 and the trough 7 are formed with mechanical couplings or connections 13 for connecting the trough to the bracket 10. The bracket legs 12 locate and support the trough 7 in slightly downwardly spaced relation to the discharge neck 8 and the bottom wall 9 of container 4. The container 4 is filled with suitable bird feed 14 which automatically discharges through the bottom neck 8 into the trough. Perch members 15 are secured to the sidewall of the trough on which the birds stand while feeding. As the birds eat the bird feed 14, there is automatic feeding of new bird feed into the trough. Of course when the bird feed is completely gone, the container 4 can be refilled through the discharge neck 8, through a special top opening, not shown, or any other suitable means.

As more particularly illustrated in FIGS. 2-5, the bird feeder and particularly container 4 and trough 7 will be recognized as being component parts of a typical commercially available soda bottle widely used in the commercial marketing of soft drinks such as shown in FIG. 4. More particularly, the container 4 is a plastic bottle having a relatively dished end wall 16 connected to a cylinderical side wall 16a. The opposite discharge end is formed with a similar curved portion 17 such that the sidewall gradually merges and curves into the relatively small narrow neck 8. For example, the bottle may have a diameter on the order of 3 to 4 inches and a neck of approximately 1 inch in diameter. The neck 8 extends outwardly with integral threads 18 for a short distance and is externally threaded to receive a sealing cap, not shown.

The bottles may and generally are formed of a relatively thin semi-flexible plastic. The bottle is conveniently grasped when emptied and can even be collasped easily inwardly. Generally such bottles are formed with a separate bottom shell 20 secured to the bottom wall 5 and projecting upwardly slightly over the lower portion of the sidewall 16a. The shell 20 is attached by a water-soluble adhesive, as shown in Fig. 4. The shell conforms to the configuration of the bottle bottom portion and includes a flat bottom wall 21 connected to relatively short side walls 22.

The shell 20 is formed of a suitable semi-flexible plastic which when attached to the bottom wall of the bottle provides a relatively firm support for stacking and otherwise handling of the bottle during the retailing of the soda or the like.

The shell 20 is formed essentially universally with circumferentially distributed openings 23 in the lower or side wall portions. In the illustrated embodiment of the invention, the shell 20 is shown with four equicircumferentially spaced openings 23. The openings 23 are located generally in the lower end of the shell sidewall at the interconnection to the flat bottom wall.

By removing of shell 20 from the bottle, the two principle components 4 and 7 of the feeder are made. The aperture shell 20 and the threaded neck 8 provide convenient interconnection means for interconnection to the support bracket 10 for locating and supporting of the shell 20 in inverted relation to the discharge neck 8, as shown in FIGS. 1 and 2.

The illustrated bracket 10 includes a central ring member 11 having a slight spiral inner edge 27 as the connecting member which can be threaded onto the threads 18 of neck 8 and provide an interconnection support therebetween. The bracket 10 includes the four outwardly and downwardly extending legs 12, equally circumferentially spaced and therefore readily aligned one each with each of four openings 23 in the shell 20.

The legs 12 of the bracket are shown as relatively flat and strip like members having a similar lateral enlargement 24 on the very outmost tip of each leg. The enlargement 24 includes an inclined side edge 25. The openings 23 in turn are relatively rectangular openings extending along the axial length of the shell. In assembly, the legs 12 and particularly the inclined enlargements are inserted through the openings 23. The enlargements 24 define supports on which the shell 20 rests in the inverted position. The bracket 10 is thus securely attached by the ring 11 to the neck 8 of the bottle and the shell 20 rests on the enlargements.

The legs 12 of course are selected of an appropriate length to hold the trough 7 centered about the neck 8 and in slightly downwardly spaced relation thereto as most clearly shown in FIG. 2. As a result, the bird feed in the container freely flows through the neck opening into the trough 7 and laterally into the outer portion thereof. The birds conveniently sit on ledge members 15 for feeding. The ledge member 15 is shown having a hair-pin mounting portion 28 and an integral projecting rod 26. With the mounting portion 28 slipped over the edge of the trough, the rod 26 extends radially outwardly from the trough.

As most clearly shown in FIGS. 1 and 2, the gradual tapered construction of the upper end portion of a bottle tends to create a convenience spacing of the bottle from the side wall of the shell 20 in the assembled relation. The spacing provides a necessary entrance into the trough for the feeding birds.

Thus in manufacture and marketing of the bird feeder, it is only necessary to form the bracket 10, with the appropriate instructions for assembly of the bracket and the conventional disassembled soda bottle.

The bracket is readily formed as a molded or stamped plastic member. Although the bracket may be formed from any suitable plastic or other flexible material, the bracket 10 could also be a relatively rigid member formed or molded to the support configuration. There are however obvious economic advantages derived from a simple, flat flexible bracket member, both from the standpoint of additional manufacturing and ease of handling and therefore marketing.

Further, the conventional soda bottle is formed of somewhat different configurations but all generally include the basic construction with the curved bottom wall to which the shell is interconnected as well as the upper construction having the curved interconnection of a projecting neck to the side wall. One difference which is widely found is use of three equicircumferential openings 29 in the base shell, as shown in FIG. 5 rather than four as illustrated in FIGS. 1-4. Where three openings are provided, a three-legged bracket would be provided for interconnecting of the shell to the bottle neck.

In a preferred construction, the bracket 10 is formed, as shown in FIG. 6, includes six legs 30, 31, 32, 33, 34 and 35. The four legs 30, 31, 32 and 33 are equicircumferentially spaced for supporting of the shell as shown of FIGS. 1-3. The two additional legs 34 and 35 are equicircumferentially distributed with respect to a selected one of the four legs such as 32 to define three equicircumferentially distributed interconnecting legs. In assembly, the user would remove the unnecessary legs.

Although illustrated and described using a conventional soda bottle, the container and trough may of course be separately designed and manufactured in any desired design or configuration for assembly with an interconnecting supporting bracket as an original manufacture. In view of the low cost involved in the mass production of the existing containers, such might even be directly packaged and sold with the container filled with appropriate bird seed. This of course would avoid the necessity of storing bulk seed or the like and the inconvenience associated with refilling of the bird feeder.

In summary, the present invention is uniquely adapted to the conversion of the conventional soda bottle to a bird feeder but suitable formed components can be directly provided as a part of the kit. In either method, an inexpensive, attractive and low cost feeder is provided.

Various modes of carrying out the invention are contemplated as being within the scope of the following claims particularly pointing out and distinctly claiming the subject matter which is regarded as the invention.

I claim:

1. A bird feeder, comprising a tubular container having an outside wall and bottom discharge tube of a diameter substantially less than the diameter of said outside wall of said container, support means secured to said container for suspending of said container with said tube depending downwardly, a cup-shaped trough having an outer side wall spaced outwardly substantially more than said discharge tube and said outer side wall being located substantially in alignment with the outside wall of said container, and a bracket member having a central portion interconnected to said tube to support said bracket member on said discharge tube and having a plurality of circumferentially spaced legs extending laterally outwardly and axially outwardly from said tube to said side wall of said cup-shaped trough, and means interconnecting the outer end of each of said legs to said trough to physically support said trough in downwardly spaced relation to said discharge tube, ledges releasably secured to the trough, each ledge being an integral molded plastic member having a hairpin mounting portion telescoped over the side wall of the trough and a rod extending outwardly of said mounting portion.

2. A bird feeder comprising, a cylindrical plastic bottle container, said container including a cylindrical side wall and a bottom discharge tubular neck interconnected by a curved corner portion to said cylindrical side wall, said tubular neck being formed with an external thread, support means connected to said container for supporting of said bottle container with said neck depending vertically downwardly, said container having a closed upper end including a top wall connected by a top corner to said side wall, a cup-shaped trough conforming essentially to the configuration of said upper end of said container including the top wall, the top corner and a short length of said side wall, said trough having at least three equicircumferentially spaced openings located in the lower portion of the trough, and a support bracket including a central ring portion threaded onto said neck and equicircumferentially spaced legs located one each in alignment with said trough openings, said legs extending outwardly and axially outwardly into said openings, the ends of said legs being mechanically coupled within said openings and serving to support said trough in fixed relation to said container and in slightly downwardly spaced relation to said neck, said container, said trough and said bracket being formed as three separate integral components, said bracket being a flat member formed of a thin bendable material having six legs circumferentially spaced about said central ring portion to define three equicircumferentially spaced legs and to define four equicircumferentially spaced legs.

3. The bird feeder of claim 2 wherein said ledge members are integrally formed to said central ring portion.

4. A mounting bracket for selectively interconnecting a cup-shaped trough having circumferentially spaced openings to a container having a relatively narrow threaded discharge tube to form a bird feeder, said bracket comprising a central ring portion adapted to be releasably secured to said tube, a plurality of interconnecting legs integrally formed with said central ring portion and projecting radially outwardly therefrom, said legs being circumferentially spaced in accordance with said openings, and said plurality of legs includes three equicircumferentially spaced legs, and said plurality of legs including a second set of three legs spaced in relationship to one leg of said first set to define four equicircumferentially spaced legs.

5. The bracket of claim 4 wherein said legs include end enlargements for passage through said openings and defining a ledge on which said trough rests in the assembled state.

6. The bracket of claim 4 wherein said bracket being formed of a relatively readily severed plastic.

7. The bracket of claim 4 including perch members each including a support rod projecting outwardly from said central ring and a hairpin mounting member on the outer end of the support rod.

8. A method of forming a bird feeder from a soda bottle unit having a cylindrical bottle with an upper discharge neck projecting outwardly essentially from the bottle sufficiently far to receive a threaded sealing cap and having a cup-shaped shell adhesively affixed to the bottom of said bottle, said shell having equicircumferentially spaced openings, comprising the steps of removing the shell from the bottle, assembling a supporting bracket having an annular center ring and a plurality of equicircumferentially spaced legs corresponding to said openings in said shell, threading said ring member onto said neck, assembling the outer ends of said legs within said openings, and securing said outer ends of said legs to said shell at said openings, and affixing an attachment means to the upper end portion of said bottle for suspending said bottle with the discharged neck depending downwardly.

9. The method of claim 8 wherein said step of removing said shell includes applying a liquid to the lower portion of said bottle to loosen the adhesive bond between the shell and the bottle.

10. The method of claim 8 wherein said bracket is a molded plastic member having six spaced legs arranged to define a set of three equicircumferentially spaced legs and a set of four equicircumferentially spaced legs.

11. The method of claim 10 including perch members each including a support rod projecting outwardly from said central ring and a hairpin mounting member on the outer end of the support rod.

* * * * *